Figure 1:
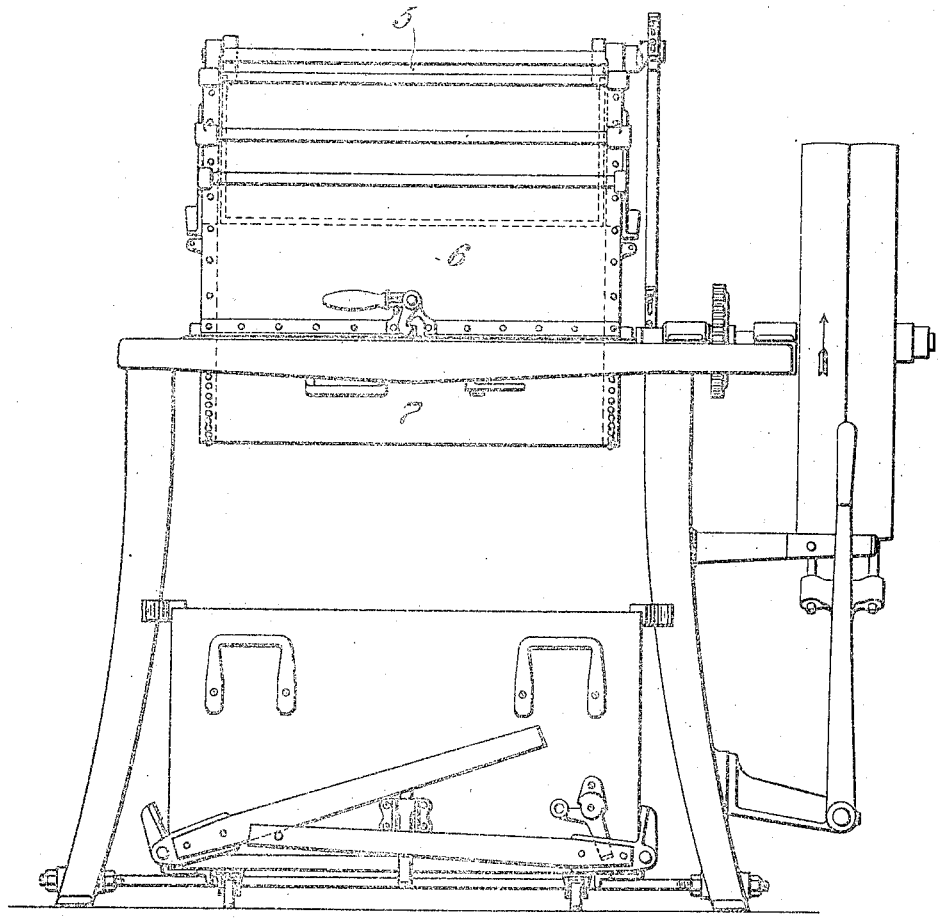

No. 852,497. PATENTED MAY 7, 1907.
C. CHAMBERS, Jr.
PROCESS OF MIXING DOUGH.
APPLICATION FILED AUG. 16, 1906.

3 SHEETS—SHEET 1.

WITNESSES:
Mae Hofmann
Jas. C. Wobensmith

INVENTOR
Cyrus Chambers, Jr.
BY
ATTORNEY.

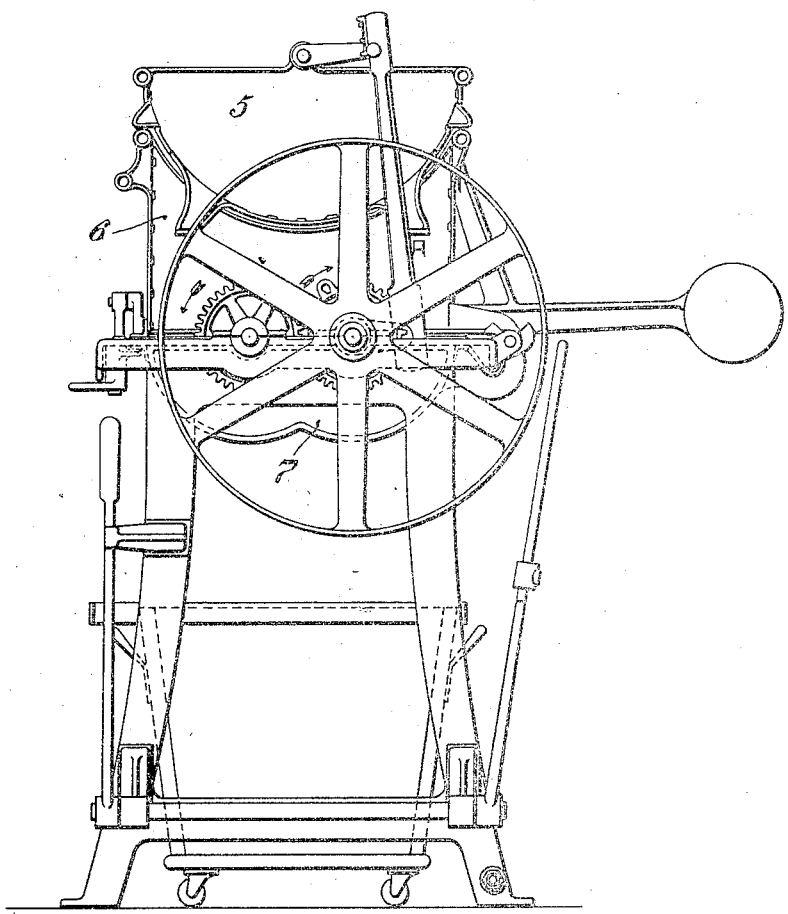

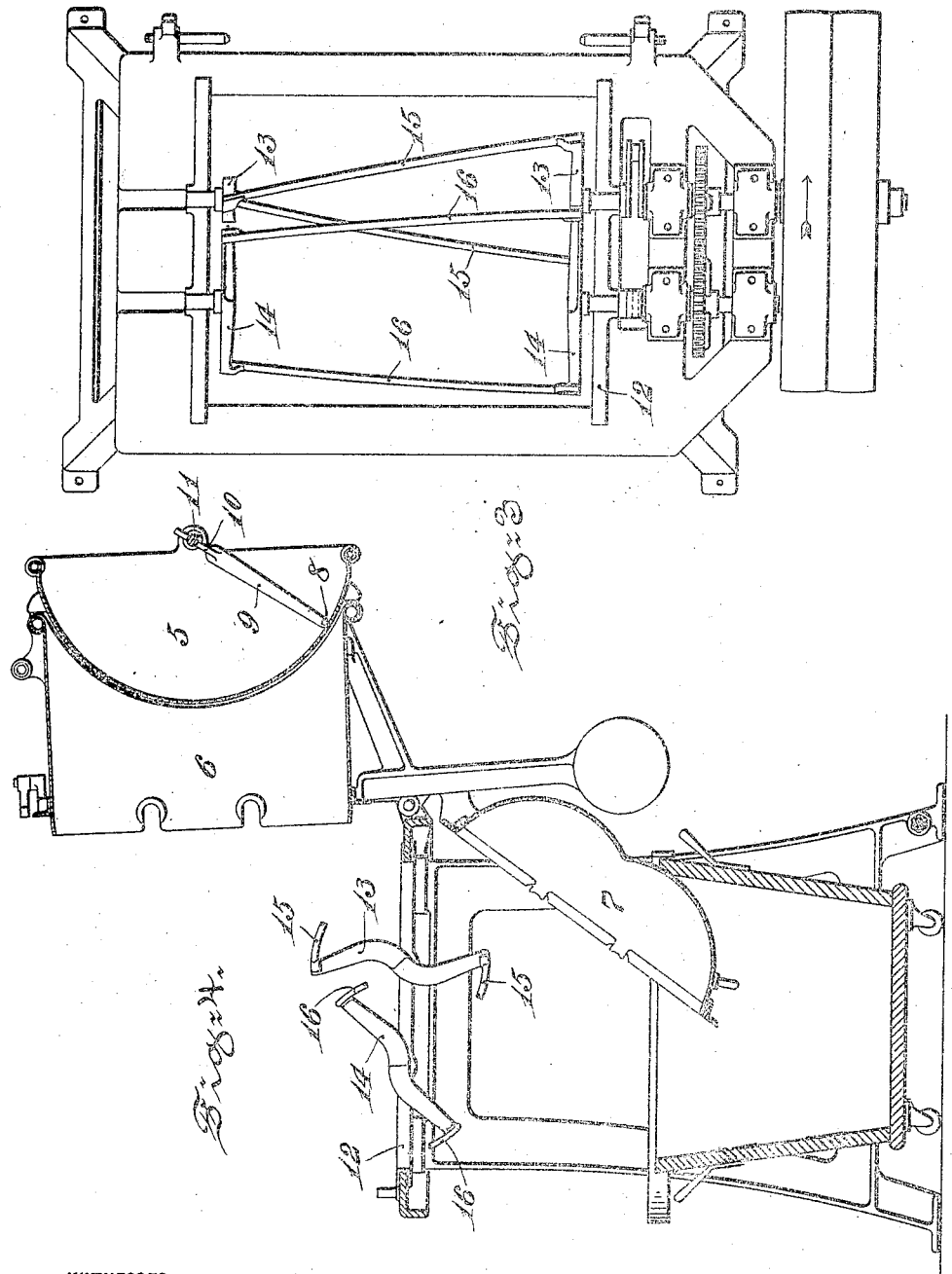

UNITED STATES PATENT OFFICE.

CYRUS CHAMBERS, JR., OF OVERBROOK, PENNSYLVANIA.

PROCESS OF MIXING DOUGH.

No. 852,497.  Specification of Letters Patent.  Patented May 7, 1907.

Application filed August 16, 1906. Serial No. 330,503.

*To all whom it may concern:*

Be it known that I, CYRUS CHAMBERS, Jr., a citizen of the United States, residing at Overbrook, in the county of Montgomery and State of Pennsylvania, have invented a new and useful Process of Mixing Dough, of which the following is a specification.

My invention relates to improvements in process of mixing dough.

The object of this invention is to provide a process or method whereby a thorough and efficient mixture of the flour and liquid is secured before the development of the gluten in the flour.

My invention comprises the process whereby the entire charge of flour and liquid are thoroughly admixed before a portion of the flour has absorbed the moisture and becomes viscous and thereby ceases to readily saturate or moisten more flour.

The time required to completely mix the flour and liquid to form the dough, I have discovered to be approximately one minute, that is to say, I have found that the best results are secured by my process by completing said operation in one minute from the time of starting the mixing.

By sifting the flour into the liquid in gradually decreasing quantities, as the mixture becomes stiffer, a more thorough permeation of the particles of flour by the moisture takes place as the mass becomes less fluid. The power required to mix the flour and moisture in accordance with my process is much less than that required after the development of the gluten when the dough becomes tenacious.

The process may be carried out in practice by a machine such as illustrated in the accompanying drawings, in which Figure 1 is a front elevation. Fig. 2 is a side elevation. Fig. 3 is a plan view with the sifter and air chamber removed. Fig. 4 is a vertical cross-section of the machine with the sifter and air chamber elevated and the mixing basin lowered into the dough tray viewed from the driven end of the machine.

Similar numerals refer to similar parts throughout the several views.

The sifter hopper 5 is detachably secured on top of the air chamber 6, which superimposes the mixing basin 7. The sifter hopper is provided with sifter rod 8, carried by the yoke 9, having their ends 10 loosely seated in slots provided in rock shaft 11.

It is to be noted that the perforated bottom of the sifter hopper 5 is substantially semi-circular in formation, extending approximately from the top margin on one side of the hopper to the top margin on the other side of the hopper. It is also to be noted that journal bearings on the rock shaft 11 are above said top margin of the hopper.

The sifter rod 8 has a travel substantially over the entire bottom of the hopper. It will thus be seen that when the hopper is full of flour a greater amount of flour will be forced by the sifter rod through the perforated bottom, and, as the flour becomes lower and lower in the hopper, a less amount will be forced therefrom by each subsequent reciprocation of the rod, until the entire charge is delivered.

Journaled in the stationary framework 12 of my device are the two pairs of spiders 13 and 14, each pair provided with the spirally formed mixing rods 15 and 16. These spiders and their mixing rods are so formed and assembled that one pair of rods will cross the travel of the other pair. These mixing rods operate in the mixing basin 7 to thoroughly commingle, agitate and work the flour and liquid and the resultant dough.

It is to be observed that the flare of the basin gives it a receiving capacity equal to the discharge area of the sifting hopper, and that the intermediate air chamber 6 is provided with vertically extending walls of substantially the same dimension, so that the flour as sifted from the hopper at its greatest discharge capacity will fall straight to the basin. It will thus be seen that when the sifter hopper is full the first stroke of the sifter rod causes the greatest quantity of flour to be discharged from the sifter to the liquid. The liquid in the basin being in its thinnest condition is able to moisten the maximum quantity of flour. As the mixing rods rotate, and the flour and liquid become commingled, the mixture gradually begins to stiffen and is capable of receiving and moistening a constantly decreasing amount of flour. To meet such condition the action of the sifter, as above explained, delivers a correspondingly constantly decreasing amount of flour, so that the said flour and moisture are brought together in the manner above described to secure the most thorough and complete admixture of the same.

I have found that by the process above described that the starch granules have been so intimately mixed and incorporated with the water, milk and yeast, or other constituents of the liquid, that at the high temperature of baking each granule has been completely gelatinized and partially converted by a so-called breaking up, bursting or rupture of the exterior wall or starch cellulose by which process the interior contents or starch-granulose is dissolved or taken up by the water with which the flour has been originally incorporated.

By this process flour-clots and so-called water-stripes, which are so commonly found in bread made by other methods, are entirely eliminated. This is additional proof that an intimate mixture of the ingredients of the dough has been effected.

By chemical examination it has been found that in bread made by my process there has been practically a complete gelatinization and partial conversion of the starch. The percentage of unbursted or unchanged starch granules obtained from an average of twelve slides of bread made by my process being less than one per cent; in a great many of the slides, unbursted starch granules were found to be entirely absent.

What I claim is:—

1. The process of mixing dough which consists in sifting the flour into the liquid in such a way that the mixing may be completed before the dissolving or the development of the gluten.

2. The process of mixing dough which consists in sifting the flour into the liquid in gradually diminishing quantities and mixing and kneading said sifted flour with the liquid during said operation.

3. The process of mixing dough, which consists in sifting the flour into the liquid and stirring or mixing said flour and liquid as the flour is being sifted, the sifting of the flour being rapid at first and then gradually diminishing.

4. The process of mixing dough, which consists in mixing flour and liquid together, the flour so mixed being sifted into the liquid in gradually decreasing quantities as the mixture becomes stiffer.

5. The process of mixing dough, which consists in delivering flour into liquid at a gradually decreasing rate of discharge and stirring, agitating or working said flour and liquid as the same are brought together and until after all the flour has been delivered to the liquid.

6. The process of mixing dough, which consists in delivering flour into liquid at a gradually decreasing rate of discharge, and mixing said flour and liquid, the delivery of said flour to said liquid being all accomplished in a space of time insufficient for the development of the gluten.

7. The process of mixing dough, which consists in delivering flour into liquid at a gradually decreasing rate of discharge, and mixing said flour and liquid as the flour is being discharged, the whole operation being accomplished within the space of approximately one minute.

CYRUS CHAMBERS, Jr.

Witnesses:
LULU D. HAUBERT,
MARY P. CHAMBERS.